US012676349B2

(12) United States Patent
Kim et al.

(10) Patent No.: US 12,676,349 B2
(45) **Date of Patent: *Jul. 7, 2026**

(54) METHODS FOR MANUFACTURING POSITIVE ELECTRODE ACTIVE MATERIAL PRECURSOR MATERIAL AND POSITIVE ELECTRODE ACTIVE MATERIAL FOR SECONDARY LITHIUM BATTERY, AND POSITIVE ELECTRODE ACTIVE MATERIAL FOR SECONDARY LITHIUM BATTERY MANUFACTURED THEREBY

(71) Applicant: DONGWOO FINE-CHEM CO., LTD., Jeollabuk-do (KR)

(72) Inventors: Myung-Jin Kim, Gwangju (KR); Ji-Hoon Lee, Gyeonggi-do (KR); Bong-Jin Choi, Chungcheongnam-do (KR)

(73) Assignee: DONGWOO FINE-CHEM CO., LTD., Jeollabuk-do (KR)

(*) Notice: Subject to any disclaimer, the term of this patent is extended or adjusted under 35 U.S.C. 154(b) by 931 days.

This patent is subject to a terminal disclaimer.

(21) Appl. No.: 17/801,634

(22) PCT Filed: Oct. 19, 2020

(86) PCT No.: PCT/KR2020/014253
§ 371 (c)(1),
(2) Date: Aug. 23, 2022

(87) PCT Pub. No.: WO2021/172688
PCT Pub. Date: Sep. 2, 2021

(65) Prior Publication Data
US 2023/0106658 A1 Apr. 6, 2023

(30) Foreign Application Priority Data
Feb. 28, 2020 (KR) ........................ 10-2020-0025135

(51) Int. Cl.
*H01M 10/54* (2006.01)
*C01G 45/10* (2006.01)
(Continued)

(52) U.S. Cl.
CPC ............ *H01M 10/54* (2013.01); *C01G 45/10* (2013.01); *C01G 51/10* (2013.01); *C01G 53/10* (2013.01);
(Continued)

(58) Field of Classification Search
CPC ...... H01M 10/54; H01M 4/505; H01M 4/525; H01M 10/052; H01M 2004/028;
(Continued)

(56) References Cited

U.S. PATENT DOCUMENTS

2013/0323142 A1* 12/2013 Shimano ............... H01M 4/505 423/49

FOREIGN PATENT DOCUMENTS

CN 101580317 11/2009
CN 105789726 7/2016
(Continued)

OTHER PUBLICATIONS

English Translation of CN108193050 (Year: 2018).*
International Search Report and Written Opinion from related PCT Application No. PCT/KR2020/014253, dated Oct. 19, 2020, 9 pages.

*Primary Examiner* — Andrew J. Oyer
(74) *Attorney, Agent, or Firm* — Brooks, Cameron & Huebsch, PLLC

(57) ABSTRACT

The present invention relates to a method of preparing a precursor material of a positive electrode active material from a waste lithium secondary battery, to a method of preparing a lithium secondary battery positive electrode active material including a precursor material prepared by
(Continued)

the same precursor preparation method, and to a lithium secondary battery positive electrode active material prepared by the same positive electrode active material preparation method.

9 Claims, 1 Drawing Sheet

(51) Int. Cl.

| | |
|---|---|
| ***C01G 51/10*** | (2006.01) |
| ***C01G 53/10*** | (2006.01) |
| ***C01G 53/50*** | (2025.01) |
| ***H01M 4/505*** | (2010.01) |
| ***H01M 4/525*** | (2010.01) |

(52) U.S. Cl.
CPC ............ *C01G 53/50* (2013.01); *H01M 4/505* (2013.01); *H01M 4/525* (2013.01); *C01P 2002/50* (2013.01); *C01P 2006/40* (2013.01)

(58) Field of Classification Search
CPC ....... H01M 4/131; C01G 45/10; C01G 51/10; C01G 53/10; C01G 53/50; C01G 51/50; C01P 2002/50; C01P 2006/40; C01P 2006/80; C22B 3/3842; C22B 3/3846; C22B 26/12; C22B 3/3844; C22B 7/001; C22B 7/005; C22B 23/043; C22B 23/0461; C22B 23/0484; C22B 47/0063; C22B 47/0081; Y02E 60/10; Y02W 30/84
See application file for complete search history.

(56) References Cited

FOREIGN PATENT DOCUMENTS

| | | | |
|---|---|---|---|
| CN | 108193050 | B | 6/2018 |
| JP | 2013-001916 | A | 1/2013 |
| KR | 10-2011-0036628 | B1 | 4/2011 |
| KR | 10-1392616 | B | 5/2014 |
| KR | 10-2019-0066351 | A | 6/2019 |
| KR | 10-2019-0123524 | A | 11/2019 |
| KR | 102064668 | | 11/2019 |
| WO | 2016-115404 | A | 7/2016 |

* cited by examiner

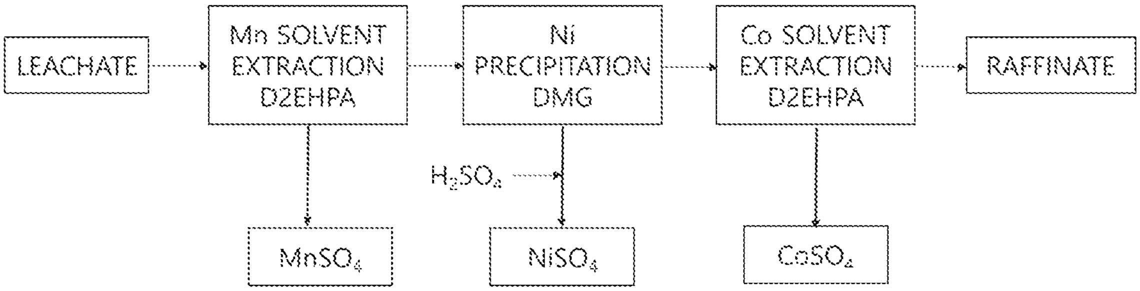
LEACHATE
Mn SOLVENT EXTRACTION D2EHPA
Ni PRECIPITATION DMG
Co SOLVENT EXTRACTION D2EHPA
RAFFINATE
$H_2SO_4$
$MnSO_4$
$NiSO_4$
$CoSO_4$

METHODS FOR MANUFACTURING POSITIVE ELECTRODE ACTIVE MATERIAL PRECURSOR MATERIAL AND POSITIVE ELECTRODE ACTIVE MATERIAL FOR SECONDARY LITHIUM BATTERY, AND POSITIVE ELECTRODE ACTIVE MATERIAL FOR SECONDARY LITHIUM BATTERY MANUFACTURED THEREBY

TECHNICAL FIELD

The present invention relates to a method of preparing a precursor material of a positive electrode active material from a waste lithium secondary battery, a method of preparing a positive electrode active material for a lithium secondary battery from the precursor material of the positive electrode active material prepared by the method, and a positive electrode active material prepared by the method.

BACKGROUND ART

The demand for secondary batteries as an energy source has increased dramatically due to the development and demand for various types of energy storage devices for small to medium-sized electronic devices such as mobile devices, laptops, wireless devices, electric vehicles, and electric motor vehicles. Among such secondary batteries, lithium secondary batteries having a high energy density, a high operating potential, a long cycle life, and a low self-discharge rate are widely used.

A lithium secondary battery is generally composed of a positive electrode containing a positive electrode active material, a negative electrode containing a negative electrode active material, a separator, and an electrolyte. The lithium secondary battery is a secondary battery that is charged and discharged by an intercalation/de-intercalation of lithium ions. Lithium secondary batteries have advantages of high energy density, high electromotive power, and high capacity. Therefore, the lithium secondary batteries can be used in a variety of applications.

Positive electrode active materials for lithium secondary batteries include transition metals, including lithium and cobalt, which are relatively expensive metals. Among them, it is known that cobalt is in unstable supply worldwide. Therefore, when waste lithium secondary batteries are recycled, in particular, when transition metals such as lithium, cobalt, nickel, and manganese are recovered from the positive electrodes of the waste lithium secondary batteries and reused as raw materials, the recovered materials may give companies competitiveness in product prices and contribute to unexpected revenues of the companies.

In order to recover and recycle transition metals such as manganese, nickel, and cobalt from waste lithium secondary batteries, a positive electrode active material is first separated from waste battery cells, a transitive metal is separated from the positive electrode active material, the obtained transition metal is refined, and the refined product undergoes a post processing process to be reused as a raw material for preparation of a new positive electrode active material.

For example, Korean Patent Application Publication No. 10-2011-036628 discloses a recycling method including obtaining a powder of valuable metals including lithium nickel, cobalt, and manganese from a waste battery, leaching the valuable metal powder with an acid in a reducing atmosphere to obtain leachate, and obtaining hydroxides of nickel cobalt, and manganese and lithium carbonate ($Li_2CO_3$) from the leachate. However, since each of the transition metals cannot be separated individually, the use of the transition metals is constrained. When the transition metals are used as a positive electrode active material, an additional transition metal salt is added to adjust the composition to have a desired ratio. After the transition metals are extracted, considerable energy and time to remove impurities are required.

In addition, a method of separating and recovering manganese, nickel, and cobalt by precipitation and/or solvent extraction during a lithium secondary battery metal oxide-based positive electrode active material reprocessing process has been studied. However, when separating and recovering nickel and cobalt, there are disadvantages in that extraction efficiency is poor, and an additional process is required to obtain a positive electrode active material because the nickel and cobalt are recovered in a form (for example, manganese dioxide and dimethylglyoxime (Ni-DMG)) that cannot be directly used as a precursor material of a positive electrode active material without undergoing the additional processing process.

Therefore, it is expected that waste lithium secondary batteries can be recycled in a simpler and more efficient manner if a method capable of separating and collecting transition metal components with high extraction efficiency and of directly using the collected transition metal components for preparation of an active material for lithium secondary batteries can be developed.

Literature of Related Art (Patent Literature 1) Korean Patent Application Publication No. 10-2011-0036628

DISCLOSURE

Technical Problem

The present invention has been made in view of the problems occurring in the related art, and an objective of the present invention is to provide a method of preparing, a precursor material of a positive electrode active material by extracting each of Mn, Ni, and Co in the form of a salt thereof with high extraction efficiency, a method of preparing a positive electrode active material for a lithium secondary battery from the precursor material prepared by the method, and a positive electrode active material for a lithium secondary battery, which is prepared by the method.

Technical Solution

In order to accomplish one of the above objectives, the present invention provides a method of preparing a precursor material of a positive electrode active material, the method including: (1) obtaining leachate containing Mn, Ni, and Co by leaching a positive electrode active material of a waste lithium secondary battery; (2) obtaining a manganese salt by performing primary solvent extraction on the leachate with a first phosphoric acid-based material; (3) obtaining a nickel salt by precipitating the resulting raffinate of the primary solvent extraction with an oxime-based material; and (4) obtaining a cobalt salt by performing secondary solvent extraction on the leachate having undergone the precipitation with a second phosphoric acid-based material.

The present invention provides a method of preparing a positive electrode active material for a lithium secondary battery, the method producing a positive electrode active material represented by $LiNi_xCo_yMn_zO_2$ (where $0 \le x \le 10$, $0 \le y \le 10$, $0 \le z \le 10$, and $x+y+z=10$) by mixing a lithium salt and the precursor material of the positive electrode active material, which is prepared by the precursor material preparation method described above.

In addition, the present invention provides a positive electrode active material for a lithium secondary battery, which is prepared by the positive electrode active material preparation method.

Advantageous Effects

The method of preparing the precursor material of a positive electrode active material, according to the present invention, can separate valuable metals contained in the positive electrode active material of a waste lithium secondary battery in the form of sulfates. Since the valuable metals are separated in the form of sulfates, an additional process is not required to prepare a new positive electrode active material from the recovered valuable metals, and thus the recovered valuable metals can be used as they are, as precursors of a positive electrode active material.

In addition, manganese, nickel, and cobalt contained in the positive electrode material of a lithium secondary battery form chelates in different pH ranges. Since the appropriate pH ranges for chelating each of manganese, cobalt, and nickel are higher in the order of manganese, cobalt, and nickel, the conventional solvent extraction for collecting the positive electrode active material was carried out in the order of manganese, cobalt, and nickel. However, when the extraction is performed in the order of manganese, cobalt, and nickel, there is a problem that Cyanex 272 known as an expensive conventional solvent extraction material has to be used because the difference in pH to form a chelate in each step is not large, resulting in an increase in unit cost for an extraction process. To solve this problem, according to the present invention, each of the components contained in a positive electrode active material is separated in the order of manganese, nickel, and cobalt, and the nickel is recovered through the precipitation method. Therefore, a phosphorus-based material can be used for solvent extraction, instead of Cyanex 272. Therefore, the problem of the high unit cost for the extraction process can be solved.

In addition, since the components are extracted in the order of manganese, nickel, and cobalt, the pH difference between processing steps that are consecutively performed is increased, resulting in improvement in extraction efficiency of metal salts during solvent extraction.

DESCRIPTION OF DRAWINGS

FIG. 1 is a flowchart for preparation of a precursor material of a positive electrode material, according to one embodiment of the present invention.

BEST MODE

The present invention relates to a method of preparing a positive electrode active material for a lithium secondary battery, the method including: separately obtaining a manganese (Mn) salt, a nickel (Ni) salt, and a cobalt (Co) salt from a positive electrode active material of a waste lithium secondary battery. In addition, the present invention relates to a positive electrode active material prepared by the positive electrode active material preparation method.

Specifically, the lithium secondary battery positive electrode active material preparation method may include: (1) leaching a positive electrode active material of a waste lithium secondary battery containing Mn, Ni, and Co to obtain leachate containing Mn, Ni, and Co; (2) performing primary solvent extraction on the leachate to obtain a manganese salt; (3) precipitating the raffinate of the primary solvent extraction to obtain a nickel salt; and (4) performing secondary solvent extraction on the leachate having undergone the precipitation to obtain a cobalt salt. The present invention also includes a method of preparing a positive electrode active material for a lithium secondary battery from the positive electrode active material precursor prepared by the precursor material preparation method, and a positive electrode active material for a lithium secondary battery, which is prepared by the positive electrode active material preparation method.

The method of preparing a precursor material of a positive electrode active material, according to the present invention, can separate valuable metals contained in a positive electrode active material of a waste lithium secondary battery in the form of sulfates. Since the valuable metals are separated in the form of sulfates, an additional process is not required to prepare a new positive electrode active material from the recovered valuable metals, and thus the recovered valuable metals can be directly used as precursors of a positive electrode active material.

In addition, manganese, nickel, and cobalt contained in a positive electrode material of a lithium secondary battery form chelates in different pH ranges. Since the appropriate pH ranges for chelating each of manganese, cobalt, and nickel is higher in the order of manganese, cobalt, and nickel, the conventional solvent extraction for collecting the positive electrode active material was carried out in the order of manganese, cobalt, and nickel. However, when the extraction is performed in the order of manganese, cobalt, and nickel, there is a problem that Cyanex 272 known as an expensive conventional solvent extraction material has to be used because the difference in pH to form a chelate between consecutive steps is not large, resulting in an increase in unit cost for an extraction process. To solve this problem, according to the present invention, the components contained in a positive electrode active material are separated in the order of manganese, nickel, and cobalt, and the nickel is recovered through the precipitation method. Therefore, Cyanex 272 needs not be used, and a phosphorus-based material can be used for solvent extraction, instead of Cyanex 272. Therefore, the problem of the high unit cost for the solvent extraction process can be solved.

In addition, since the components are extracted in the order of manganese, nickel, and cobalt, the pH difference between the processing steps that are consecutively performed is increased, resulting in improvement in extraction efficiency of metal salts during solvent extraction.

Hereinafter, a method of preparing a precursor material of a positive electrode active material, a method of preparing a positive electrode active material from a precursor material prepared by the precursor material preparation method, and a positive electrode active material prepared by the positive electrode active material preparation method, according to the present invention, will be described in detail. However, the present invention is not limited by the description.

<Method of Preparing a Precursor Material of a Positive Electrode Active Material>

A method of preparing a precursor material of a positive electrode active material, according to the present invention, includes: (1) leaching a positive electrode active material of a waste secondary battery, containing Mn, Ni, and Co to obtain leachate containing Mn, Ni, and Co; (2) performing primary solvent extraction on the leachate with a first extractant to obtain a manganese salt; (3) precipitating the raffinate of the primary solvent extraction with a precipitating agent to obtain a nickel salt; and (4) performing secondary solvent extraction on the leachate having undergone the precipitating with a second extractant to obtain a cobalt salt. In addition, the method of preparing a precursor material of a positive electrode active material, according to the present invention, may further include recovering a lithium salt. In the method, the first extractant and the second extractant include a phosphoric acid-based material, and the precipitating agent includes an oxime-based material.

In particular, in the present invention, since the nickel (Ni) salt obtainment step having the largest difference in optimum solvent extraction pH compared to the manganese (Mn) salt obtainment step is performed directly after the Mn salt obtainment step, the Ni salt preparation efficiency is maximized. Therefore, the efficiency of the preparation of the expensive Co salt is maximized by minimizing the non-Co components included in the leachate from which the Co salt is to be obtained through solvent extraction.

The precursor materials for a positive electrode active material of the present invention include manganese sulfate as the Mn salt, nickel sulfate as the Ni salt, and cobalt sulfate as the Co salt.

(1) Step of Obtaining Leachate Containing Mn, Ni, and Co by Leaching Positive Electrode Active Material of Waste Lithium Secondary Battery In the present invention, a waste lithium secondary battery positive electrode active material contains Mn, Ni, and Co and is represented by the following Formula 1:

$$LiNi_xCo_yMn_zO_2 \quad \text{[Formula 1]}$$

In Formula 1, the conditions "$0<x<10$, $0<y<10$, and $0<z<10$, $x+y+z=10$" are satisfied. Preferably, $x=5$, $y=2$, and $z=3$.

The material for leaching the positive electrode active material may be sulfuric acid or hydrogen peroxide.

The positive electrode active material precursor preparation method of the present invention may further include a pretreatment process for obtaining a positive electrode active material of a waste lithium secondary battery in which the positive electrode active material contains Mn, Ni, and Co. The pretreatment process may be a heat treatment process that is subsequent to a step of pulverizing the waste lithium secondary battery.

In the pretreatment process, a step of discharging the waste lithium secondary battery may be performed prior to the pulverization. After the discharging is completed, the subsequent recovery process can be safely performed even in a non-inert atmosphere. The discharging may be performed in a discharging solution. Distilled water may be used as the discharging solution. The level of the discharge can be determined by checking a decrease in voltage over time. The electrolyte in the waste lithium secondary battery is mostly removed during the discharging.

The pulverization may be performed by milling. The milling may be mechanical milling. Specifically, the milling may be performed by one or more methods selected from the group consisting of roll-milling, ball-milling, jet-milling, planetary-milling, and attrition-milling.

The pulverized matter may have a particle size of 1 to 15 μm. Preferably, the pulverized matter may have a particle size of 1 to 7 μm. More preferably, the pulverized matter may have a particle size of 2 to 5 μm.

The pretreatment process may further include a classification step subsequent to the pulverization step. The pulverized matter may be largely classified by sieving into a micro-electrode composite powder and other components (for example, a positive electrode, a negative electrode, and a separator). Thus, the electrode composite powder is preferably collected from the pulverized matter through the classification.

The pretreatment process may further include a gravity separation step subsequent to the classification step. A rinse tank with a water level may be used to perform the gravity separation Through the gravity separation the separators may be removed. In addition, the electrode assemblies, the separators, and the current collectors may be separated.

The pretreatment process may further include a magnetic separation step subsequent to the gravity separation step. When the waste lithium secondary battery contains stainless steel (SUS), the stainless steel (SUS) is selectively removed from the pulverized matter by magnetic separation.

In the pretreatment process, the heat treatment may be performed after the magnetic separation step. The heat treatment may be performed to remove impurities other than the positive active material. For example, a positive electrode binder, a positive electrode conductive material, a negative electrode active material, a negative electrode binder, a negative electrode conductive material, and a pouch included in the waste lithium secondary batteries may be removed. The heat treatment may be performed in a temperature range of 600° C. or higher and of lower than 1000° C., preferably in a temperature range of 700° C. to 900° C., and more preferably in a temperature range of 800° C. to 900° C. When the heat treatment temperature is 1000° C. or higher, the lithium in the positive electrode active material may be undesirably removed.

In addition, the method of paring the precursor material for a positive electrode active material, according to the present invention, may include an impurity removal step in which sulfuric acid is mixed with the pretreated material after the heat treatment so that the remaining impurities such as carbon material (negative electrode active material) and copper can be removed.

The waste lithium secondary battery includes a positive electrode, a negative electrode, a separator, and an electrolyte. The waste lithium secondary battery may further include a pouch. Specifically, the waste lithium secondary battery may be a battery structured such that the separator is disposed between the negative electrode and the positive electrode, and the separator is provided with an electrolyte solution containing an electrolyte. More specifically, the waste lithium secondary battery may be a battery manufactured, for example, by stacking the negative electrode, the separator, and the positive electrode in this order, then rolling or folding the stack, then putting the rolled or folded stack into a cylindrical or angular cell case or pouch, and finally injecting an organic electrolyte into the cell case or pouch.

The positive electrode of the waste lithium secondary battery may be made of a lithium metal or a lithium transition metal oxide. The positive electrode of the waste lithium secondary battery may be a positive electrode manufactured by a conventional method known in the art. For example, a positive electrode active material is added to a solvent and mixed by stirring to prepare a slurry. A binder, a conductive material, and a dispersant may be additionally added to the slurry, if necessary. The slurry is then applied on a positive electrode current collector, compressed, and dried to manufacture a positive electrode.

The binder may include one or more compounds represented by Formula 1:

$$LiNi_xCo_yMn_zO_2 \quad \text{[Formula 1]}$$

In Formula 1, the conditions "$0<x<10$, $0<y<10$, and $0<z<10$, $x+y+z=10$" are satisfied. Preferably, $x=5$, $y=2$, and $z=3$, but the values of x, y, and z are not limited thereto.

The solvent for the positive electrode may be N-methyl-2-pyrrolidone (NMP), acetone, water, or a mixture thereof. As the conductive material for the positive electrode, a conductive auxiliary material such as polyacrylic acid, acetylene black, furnace black, graphite, carbon fiber, or fluorene may be used.

The binder for the positive electrode is a component that assists in bonding the particles of the positive electrode active material to each other and in bonding the positive electrode active material to the positive electrode current collector. Examples of the binder include may include polyacrylic acid, polyvinylidene fluoride, polyvinyl alcohol, carboxymethyl cellulose (CMC), starch, hydroxypropyl cellulose, regenerated cellulose, polyvinylpyrrolidone, tetrafluoroethylene polyethylene, polypropylene, ethylene-propylene-diene terpolymer (EPDM), sulfonated EPDM, styrene butyrene rubber, fluororubber various copolymers thereof, etc.

The positive electrode current collector may have a thickness of about 3 μm to about 500 μm. The material of the positive electrode current collector is not particularly limited if it has a high conductivity without causing a chemical change in the battery cell. For example, stainless steel, aluminum, nickel, titanium, or heat-treated carbon may be used. Alternatively, aluminum or stainless steel that is surface treated with a material selected from the group consisting of carbon, nickel, titanium, silver, and combinations thereof may be used. The positive electrode current collector may be formed to have fine irregularities on the surface thereof so that the adhesion to the positive electrode active material can be increased. The positive electrode current collector may be in the form of film, sheet, foil, net, a porous body, foam, or a nonwoven body.

The negative electrode of the waste lithium secondary battery may be manufactured by a conventional method known in the art. For example, a negative electrode active material is added to a solvent and mixed by stirring to prepare a slurry. A binder, a conductive material, and a dispersant may be additionally added to the slurry, if necessary. The slurry is then applied on a negative electrode current collector, compressed, and dried to manufacture a negative electrode.

The negative electrode active material may be carbon material, lithium metal, silicon, or tin that can intercalate or de-intercalate lithium ions. Preferably, the negative electrode active material may be a carbon material, and examples of the carbon material may include low-crystalline carbon, high-crystalline carbon, and the like. Examples of low-crystalline carbon include soft carbon and hard carbon. Examples of high-crystalline carbon include high-temperature plastic carbon such as natural graphite, kish graphite, pyrolytic carbon, mesophase pitch based carbon fiber, mesocarbon microbeads, mesophase pitches, and cokes derived from petroleum or coal tar pitch.

The solvent for the negative electrode may be N-methyl-2-pyrrolidone (NMP), acetone, water, or a mixture thereof. As the conductive material for the negative electrode, a conductive auxiliary material such as polyacrylic acid, acetylene black, furnace black, graphite, carbon fiber, or fluorene may be used.

The binder for the negative electrode is a component that assists in bonding the particles of the negative electrode active material to each other and in bonding the negative electrode active material to the negative electrode current collector. Examples of the binder include may include polyacrylic acid, polyvinylidene fluoride, polyvinyl alcohol, carboxymethyl cellulose (CMC), starch, hydroxypropyl cellulose, regenerated cellulose, polyvinylpyrrolidone, tetrafluoroethylene, polyethylene, polypropylene, ethylene-propylene-diene terpolymer (EPDM), sulfonated EPDM, styrene butyrene rubber, fluororubber, various copolymers thereof, etc.

Typically, the negative electrode current collector has a thickness of about 3 μm to about 500 μm. The material of the negative electrode current collector is not particularly limited if it has conductivity and does not cause chemical change in the battery cell. For example, copper, stainless steel, aluminum, nickel, titanium, or heat-treated carbon may be used. Alternatively, copper or stainless steel that is surface treated with carbon, nickel, titanium, or silver may be used. Further alternatively, an aluminum-cadmium alloy may be used. In addition, like the positive electrode current collector, the negative electrode current collector may be formed to have fine irregularities on the surface thereof so that the adhesion to the negative electrode active material can be increased. The negative electrode current collector may be in the form of film, sheet, foil, net, a porous body, foam, or a nonwoven body.

Although the type of the separator of the waste lithium secondary battery is not particularly limited, it may be a porous substrate made of a polyolefin-based polymer selected from the group consisting of ethylene homopolymer, propylene homopolymer ethylene-butene copolymer, ethylene-hexene copolymer, and ethylene-methacrylate copolymer. Alternatively, it may be a porous substrate made of a polymer selected from the group consisting of polyester, polyacetal, polyamide, polycarbonate, polyimide, polyetheretherketone, polyethersulfone, polyphenylene oxide, polyphenylenesulfite, and polyethylenaphthalene. Further alternatively, it may be a porous substrate made of a mixture of inorganic particles and a hinder polymer. In particular, in order for the lithium ions of the lithium ion supply core unit to be easily transferred to the external electrode, it is preferable to use a nonwoven separator corresponding to a porous substrate made of a polymer selected from the group consisting of polyester, polyacetal polyamide, polycarbonate, polyimide, polyether etherketone, polyethersulfone, polyphenylene oxide, polyphenylenesulfite, polyethylenaphthalene, or any combination thereof.

The separator has pore sizes ranging from about 0.01 μm to about 10 μm and has a thickness in a range of from about 5 μm to about 300 μm.

The electrolyte of the waste lithium secondary battery may be a gel-type polymer electrolyte using PEO, PVdF, PVdF-HFP, PMMA, PAN, or PVAC. Alternatively, the electrolyte may be a solid electrolyte using PEO, polypropylene oxide (PPO), polyethylene imine (PEI), polyethylene sulphide (PES), or polyvinyl acetate (PVAc). In addition, the electrolyte may be a non-aqueous solution using ethylene carbonate (EC), propylene carbonate (PC), butylene carbonate (BC), vinylene carbonate (VC), diethylcarbonate (DEC), dimethylcarbonate (DMC), ethylmethylcarbonate (EMC), methylformate (MF), gamma-butyrolactone (γ-BL), sulfolane, methylacetate (MA), or methylpropionate (MP). The electrolyte may further include a lithium salt. For example, the lithium salt may be LiCl, LiBr, LiI, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $CF_3SO_3Li$, $(CF_3SO_2)_2NLi$, chloroborane lithium, lower aliphatic carbonate lithium, or tetraphenylborate lithium.

In one embodiment of the present application, the waste lithium secondary battery may additionally use an organic solid electrolyte and/or an inorganic solid electrolyte in addition to the separator, but the present invention is not limited thereto. When the organic solid electrolyte and/or the inorganic solid electrolyte is used, in some cases, the solid electrolyte may also function as the separator. In these cases, it is not necessary to use the separator described above.

The organic solid electrolyte may include, but is not limited to, polyethylene derivatives, polyethylene oxide derivatives, polypropylene oxide derivatives, phosphoric ester polymers, polyvinyl alcohol, or poly fluorinated vinylidene. The inorganic solid electrolyte may include, but is not limited to, one selected from the group consisting of $Li_3N$, LiI, $Li_5NI_2$, $Li_3N$—LiI—LiOH, $Li_2SiS_3$, $Li_4SiO_4$, $Li_4SiO_4$—LiI—LiOH, $Li_3PO_4$—$Li_2S$—$SiS_2$, and combinations thereof.

(2) Step of Performing Primary Solvent Extraction on the Leachate to Obtain Manganese (Mn) Salt The positive electrode active material precursor preparation method according to the present invention includes extracting a Mn salt by performing primary solvent extraction on the leachate with a first phosphoric acid-based material. The primary solvent extraction may be carried out in an acidic atmosphere, preferably carried out at a pH level of 2 to 4, more preferably carried out at a pH level of 3 to 4, and most preferably carried out at about a pH level of 4.

In the present invention, the manganese salt includes manganese sulfite ($MnSO_4$).

The first phosphoric acid-based material may be a manganese salt extractant. The manganese salt extractant may include a material that can extract a Mn salt with an efficiency of 80% or more in a pH range of 2 to 3, preferably in a pH range of 2 to 4, and more preferably at a pH level of 4. The extraction efficiency of the Mn salt may be 80% or more, preferably 85% or more, and more preferably 90% or more.

The first phosphoric acid-based material may include a saponified material, and the first phosphoric acid-based material may be in a state of being dissolved in an organic solvent.

In the present invention, the first phosphoric acid-based material may include one or more compounds selected from the compounds represented by Formula 2 or Formula 3.

[Formula 2]

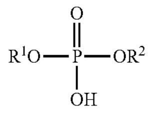

In Formula 2, $R^1$ and $R^2$ may be each independently a C1 to C30 straight or branched chain alkyl group with or without a hetero atom, preferably a C1 to C23 straight or branched chain alkyl group with or without a hetero atom, and more preferably a C6 to C10 straight or branched chain alkyl group but are not limited thereto. The hetero atoms may be atoms of one or more elements selected from oxygen, sulfur, and nitrogen.

[Formula 3]

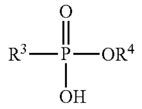

In Formula 3, $R^3$ and $R^4$ may be each independently a C1 to C30 straight or branched chain alkyl group with or without a hetero atom, preferably a C1 to C23 straight or branched chain alkyl group with or without a hetero atom, and more preferably a C6 to C10 straight or branched chain alkyl group but are not limited thereto. The hetero atoms may be atoms of one or more elements selected from oxygen, sulfur, and nitrogen.

For example, the first phosphoric acid-based material may be one or more materials selected from di-(2-ethylhexyl) phosphoric acid (D2EHPA) and 2-ethylhexyl phosphoric acid mono 2-ethylhexyl ester (PC88A). Preferably, the first phosphoric acid-based material may be di-(2-ethylhexyl) phosphoric acid.

In addition, the purity of the manganese salt may be 80% or more, preferably 85% or more, and more preferably 88% or more.

The primary solvent extraction may include washing and back extraction following the extraction using the first phosphoric acid-based material, in which the washing and back extraction may be performed using sulfuric acid. With the use of sulfuric acid, the manganese salt can be obtained in the form of a sulfate.

Since the desired metal is extracted by chelation with the use of an extractant, and hydrogen ions are released when the metal is extracted, pH adjustment needs to be inevitably performed to adjust the reaction equilibrium.

The washing is performed to remove impurity metals extracted earlier than the desired metal, and the back extraction is performed to rapidly raise the hydrogen ion concentration to induce a reverse reaction of the extraction. The extraction and back extraction can be represented by the following reaction formulas.

$$M^{2+}+2RH \rightarrow MR_2+2H^+ \qquad \text{Extraction:}$$

$$MR_2+2H^+ \rightarrow M^{2+}+2RH \qquad \text{Back Extraction:}$$

(3) Precipitating Raffinate of Solvent Extraction to Obtain Nickel (Ni) Salt

The positive electrode active material precursor preparation method according to the present invention includes extracting a Ni salt by performing precipitation on the raffinate of the primary solvent extraction with the use of an oxime-based material. The precipitation may be carried out in an acidic atmosphere, preferably carried out at a pH level of 4 to 6, more preferably carried out at a pH level of 5 to 6, and most preferably carried out at a pH level of about 6.

When Nickel and cobalt are both extracted through solvent extraction, since the Ni extraction and the Co extraction are performed at pH levels having a small difference, the extraction efficiency and the purity of the extracted materials are low. However, according to the present invention, since the salt is first separated by the precipitation method, and the Co salt is then extracted by the solvent extraction method, the extraction efficiency and purify of Co can be improved.

In addition, the step of obtaining the Ni salt through the precipitation of the raffinate of the solvent extraction may include addition of sulfuric acid.

In the present invention, the nickel salt includes nickel sulfate ($NiSO_4$).

The oxime-based material may be a nickel salt precipitating agent. The precipitating agent may include a material that can extract a Ni salt with an efficiency of 80% or more in a pH range of 4 to 6, preferably in a pH range of 5 to 6, and more preferably at a pH level of 6. The Ni salt leaching efficiency may be 80% or more, preferably 85% or more, and more preferably 90% or more.

For example, the oxime-based material may be one or more materials selected from the group consisting of dimethylglyoxime (DMG), diethylglyoxime, dipropylglyoxime, and ethylmethylglyoxime. Specifically, the oxime-based material may be dimethylglyoxime. In the related art, dimethylglyoxime has been used primarily as an indicator of the presence or absence of nickel in precipitates. However, in the present invention, the dimethylglyoxime serves to precipitate nickel-containing leachate to separate nickel salts.

The oxime-based material may be added in a molar ratio of 2 to 4 times the moles of nickel remaining in the raffinate of the solvent extraction and preferably in a molar ratio of 2.2 times.

In addition, the purity of the nickel salt may be 90% or more, preferably 95% or more, and more preferably 99% or more.

(4) Step of Performing Secondary Solvent Extraction on Leachate Having Undergone Precipitation to Obtain Cobalt (Mn) Salt The positive electrode active material precursor preparation method according to the present invention includes extracting a Co salt by performing secondary solvent extraction on the leachate having undergone the precipitation, with a second phosphoric acid-based material. The secondary solvent extraction may be carried out in an acidic atmosphere, preferably carried out at a pH level of 4 to 5.5, more preferably carried out at a pH level of 4 to 5, and most preferably carried out at a pH level of about 5.

In the present invention, the cobalt salt includes cobalt sulfate ($CoSO_4$).

The second phosphoric acid-based material may be a cobalt leaching agent. The second phosphoric acid-based material may include a material by which the Co salt can be extracted with an efficiency of 80% or more in a pH range of 4 to 5.5, preferably in a pH range of 4 to 5, and more preferably at a pH level of about 5. The extraction efficiency of the Co salt may be 80% or more, preferably 85% or more, and more preferably 90% or more. The second phosphoric acid-based material may include a saponified material.

In the present invention, the second phosphoric acid-based material may include one or more compounds selected from the compounds represented by Formula 2 or Formula 3.

[Formula 2]

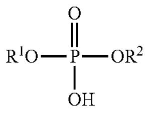

In Formula 2, $R^1$ and $R^2$ may be each independently a C1 to C30 straight or branched chain alkyl group with or without a hetero atom, preferably a C1 to C23 straight or branched chain alkyl group with or without a hetero atom, and more preferably a C6 to C10 straight or branched chain alkyl group, but are not limited thereto. The hetero atoms may be atoms of one or more elements selected from oxygen, sulfur, and nitrogen.

[Formula 3]

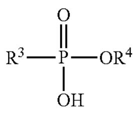

In Formula 3, $R^3$ and $R^4$ may be each independently a C1 to C30 straight or branched chain alkyl group with or without a hetero atom, preferably a C1 to C23 straight or branched chain alkyl group with or without a hetero atom, and more preferably a C6 to C10 straight or branched chain alkyl group, but are not limited thereto. The hetero atoms may be atoms of one or more elements selected from oxygen, sulfur, and nitrogen.

For example, the second phosphoric acid-based material may be one or more materials selected from di-(2-ethylhexyl) phosphoric acid (D2EHPA) or 2-ethylhexyl phosphoric acid mono 2-ethylhexyl ester (PC88A). Preferably, the second phosphoric acid-based material may be di-(2-ethylhexyl) phosphoric acid. Specifically, the di-(2-ethylhexyl) phosphoric acid is relatively inexpensive compared to Cyanex 272, which is known as a conventional cobalt extractant for solvent extraction, thereby lowering process costs.

In addition, the purity of the cobalt salt may be 90% or more, preferably 95% or more, and more preferably 99% or more.

The secondary solvent extraction may include washing and back extraction following the extraction using the second phosphoric acid-based material, in which the washing and back extraction may be performed using sulfuric acid. With the use of sulfuric acid, the cobalt salt can be obtained in the form of a sulfate.

<Method of Preparing Positive Electrode Active Material for Lithium Secondary Battery>

The present invention provides a positive electrode active material preparation method for a lithium secondary battery, the method obtaining a positive electrode active material represented by $LiNi_xCo_yMn_zO_2$ (where $0 \le x \le 10$, $0 \le y \le 10$, $0 \le z \le 10$, and $x+y+z=10$) by mixing a lithium salt with a positive electrode active material precursor prepared by the positive electrode active material precursor preparation method according to the present invention.

The positive electrode active material prepared according to the present invention is not particularly limited if the material includes a nickel salt, a cobalt salt, or a manganese salt. The positive electrode active material may be a binary positive electrode active material including at least two of nickel, cobalt, and manganese, or a ternary positive electrode active material including nickel, cobalt, and manganese.

The lithium secondary battery positive electrode active material preparation method of the present invention may be performed according to a known method except that the positive electrode active material precursor prepared according to the present invention is used.

<Positive Electrode Active Material for Lithium Secondary Battery>

In addition, the present invention provides a lithium secondary battery positive electrode active material prepared by the positive electrode active material preparation method according to the present invention. The lithium secondary battery positive electrode active material of the present invention may be prepared according to a known method except that the positive electrode active material precursor prepared according to the present invention is used.

MODE FOR INVENTION

The present invention will be described in more detail with reference to examples described below. The examples are intended to describe the present invention in more detail but the scope of tie present invention is not limited by the examples.

Example 1

900 kg of NCM 523, which is a positive electrode material, separated from waste lithium secondary batteries was pulverized by milling to have a particle size of 2 μm to 5 μm. The obtained powder was reacted with a sulfuric acid solution for 6 hours or longer, so that leachate containing Li, Mn, Co, Ni was obtained. In this example, the extraction was performed in the following order: Mn salt, Ni salt, and Co salt.

First, to extract Mn from the leachate containing Li, Mn, Co, and Ni, the leachate as a feed solution was adjusted to have a pH level of 4. As an extractant, D2EHPA 1 M solution diluted with kerosene (50% saponified) was used. As a washing solution, 0.25 M sulfuric acid was used. As a back-extractant, 2 M sulfuric acid was used. The feed solution, the extractant, the washing solution, and the back-extractant were supplied to a mixer-settler apparatus at a flow rate of 33 mL/min a flow rate of 66 mL/min, a flow rate of 13 mL/min, and a flow rate of 13 mL/min, respectively. Thus, the solvent extraction was performed by extraction, washing, and back extraction performed in this order. After the back extraction process, a high-purity manganese sulfate solution was obtained.

The raffinate resulting from the Mn solvent extraction was then adjusted to have a pH level of 6, followed by addition of dimethylglyoxime (DMG) at a 2.2-fold molar ratio to Ni. The precipitate was filtered off and the filtrate was used for Co solvent extraction. The precipitate was sulphated to obtain a high-purity nickel sulphate.

The filtrate from which Ni was separated underwent the Co solvent extraction. The filtrate was adjusted to have a pH level of 5.0, and the pH-adjusted filtrate was used as the feed solution. The extractant was a D2EHPA 1 M solution diluted with kerosene (50% saponified), 0.25 M sulfuric acid was used as a washing solution, and 2 M sulfuric acid was used as a back-extractant. The feed solution, the washing solution, and the back-extractant were supplied to a mixer-settler apparatus at a flow rate of 50 mL/min, a flow rate of 7 mL/min, a flow rate of 7 mL/min, respectively. Thus, the solvent extraction was performed by extraction, washing, and back extraction performed in this order. After the back extraction process, a high-purity cobalt sulfate solution was obtained.

FIG. 1 illustrates a process of preparing precursors for a positive electrode active material from a waste lithium secondary battery, according to the present example. The extraction efficiency and purity of the materials obtained in each step of the present example are shown in Table 1.

Example 2

Leachate containing Li, Mn, Co, and Ni was obtained in the same manner as in Example 1 described above and Comparative Example 1. After obtaining a manganese sulfate solution in the same manner as in Example 1 above, nickel sulfate was obtained.

Cobalt salt extraction was carried out in the same manner as Example 1 above except that PC88A was used as an extractant to obtain a cobalt sulfate solution.

The extraction efficiency and purities of the positive electrode active material precursors obtained in the respective steps of Example 2 are shown in Table 1 below.

Comparative Example 1

900 kg of NCM 523, which is a positive electrode material separated from a waste lithium secondary battery, was pulverized by milling. The obtained positive electrode active material powder was reacted with a sulfuric acid solution for 6 hours or longer, so that leachate containing Li, Mn, Co, Ni was obtained. In this comparative example, the extraction was performed in the following order: Mn salt, Co salt, and Ni salt.

To extract a Mn salt from the leachate containing Li, Mn, Co, and Ni, D2EHPA 1 M (50% saponified) as a solvent extractant, a 0.2 to 0.25 M sulfuric acid solution as a washing solution, a 2 M sulfuric acid solution as a back-extractant were used. The operation was performed in the order of extraction, washing, and back extraction, using a mixer-settler apparatus. After the back extraction, a manganese sulfate solution was obtained.

The subsequent Co solvent extraction operation was performed on the raffinate obtained after the Mn extraction. The Co extraction was performed under conditions in which Cyanex 272 1M (50% saponified), a 0.2 to 0.25 M sulfuric acid solution as a washing solution, and a 2 M sulfuric acid solution as a back-extractant were used. The operation was performed in the order of extraction, washing, and back extraction, using a mixer-settler apparatus. After the back extraction, a cobalt sulfate solution was obtained.

The Ni solvent extraction operation was performed on the raffinate obtained after the Co extraction. The Ni extraction was performed under conditions in which D2EHPA 1M (60% saponified), a 0.2 to 0.25 M sulfuric acid solution as a washing solution, and a 2 M sulfuric acid solution as a back-extractant were used. The operation was performed in the order of extraction, washing, and back extraction, using a mixer-settler apparatus. After the back-extraction, a nickel sulfate solution was obtained.

The extraction efficiency and purities of the positive electrode active material precursors obtained in the respective steps of Comparative Example 1 are shown in Table 1 below.

Comparative Example 2

Leachate containing Li, Mn, Co, and Ni was obtained in the same manner as in Example 1 and Comparative Example 1. Next, a Mn salt, a Ni salt, and a Co salt were obtained in a way described below.

The leachate was adjusted to have a pH level of 2.5, and $KMnO_4$ was added while the temperature of the leachate was maintained at 80° C. In this case, the mole number of $KMnO_4$ was the same as the mole number of Mn. After about an hour of reaction, the precipitate was collected through filtration to obtain $MnO_2$.

The supernatant obtained through the Mn precipitation was adjusted to a pH level of 5.0, the temperature of the supernatant was maintained at 80° C., and DMG was added thereto. In this case, the DMG was used in an amount twice the amount of Ni. After a 1 hour of reaction, the precipitate was collected through filtration to obtain Ni-DMG.

The subsequent Co solvent extraction operation was performed on the raffinate remaining after the Ni extraction. The Co extraction was performed under conditions in which Cyanex 272 1M (50% saponified) diluted with kerosene, a 0.2 to 0.25 M sulfuric acid solution as a washing solution, and a 2 M sulfuric acid solution as a back-extractant were used. The operation was performed in the order of extraction, washing, and back extraction, using a mixer-settler apparatus. After the back extraction, a cobalt sulfate solution ($CoSO_4$) was obtained.

The extraction efficiency and purities of the positive electrode active material precursors obtained in the respective steps of Comparative Example 2 are shown in Table 1 below.

Comparative Example 3

Comparative Example 3 was performed in the same manner as Example 1 above except that the order of cobalt salt extraction and nickel salt extraction was changed. That is, the extraction was performed in the order of Mn salt, Co salt, and Ni salt.

The extraction efficiency and purities of the positive electrode active material precursors obtained in the respective steps of Comparative Example 3 are shown in Table 1 below.

TABLE 1

| | | | |
|---|---|---|---|
| **Example 1** | | | |
| Extraction order | (2) Mn | (3) Ni | (4) Co |
| Materials used | D2EHPA | DMG | D2EHPA |
| Product | $MnSO_4$ | $NiSO_4$ | $CoSO_4$ |
| Extraction efficiency | 82% | 90% | 95% |
| Purity | 88% | 99.95% | 99.60% |
| **Example 2** | | | |
| Extraction order | (2) Mn | (3) Ni | (4) Co |
| Materials used | D2EHPA | DMG | PC88A |
| Product | $MnSO_4$ | $NiSO_4$ | $CoSO_4$ |
| Extraction efficiency | 83% | 90% | 87% |
| Purity | 88% | 99.93% | 99.50% |
| **Comparative Example 1** | | | |
| Extraction order | (2) Mn | (3) Ni | (4) Co |
| Materials used | D2EHPA | Cyanex 272 | D2EHPA |
| Product | $MnSO_4$ | $CoSO_4$ | $NiSO_4$ |
| Extraction efficiency | 81% | 87% | 74% |
| Purity | 88.20% | 99.40% | 93.60% |
| **Comparative Example 2** | | | |
| Extraction order | (2) Mn | (3) Ni | (4) Co |
| Materials used | KMnO4 | DMG | Cyanex 272 |
| Product | $MnO_2$ | Ni-DMG | $CoSO_4$ |
| Extraction efficiency | 80% | 89% | 81% |
| Purity | 99.20% | 99.94% | 91.55% |
| **Comparative Example 3** | | | |
| Extraction order | (12) Mn | (23) Co | (34) Ni |
| Materials used | D2EHPA | D2EHPA | DMG |
| Product | $MnSO_4$ | $CoSO_4$ | $NiSO_4$ |
| Extraction efficiency | 82% | 72% | 68% |
| Purity | 88% | 74% | 99.93% |

Referring to Table 1, when the processing was performed in the same sequence as in any example of the present invention, the precursor materials for a positive electrode active material were obtained in the form of Mn, Ni, and Co sulfates, which are directly usable as positive electrode active material precursors. In addition, it was found that the extraction efficiency and purity of each product were both higher than 80%.

On the other hand, in the case of Comparative Examples 1 and 3, which differ in extraction sequence from the present application, the products can be obtained in the form of sulfates, but the extraction efficiency of the nickel salt or the cobalt salt was 80% or less. On the other hand, in the case of Comparative Example 2 in which the extraction sequence was the same as the method of the present invention but the extractant used in the present invention was not used, the products could not be obtained in the form of sulfates.

The invention claimed is:

1. A method of preparing a precursor material of a positive electrode material, the method comprising:

(1) obtaining leachate containing Mn, Ni, and Co by leaching a positive electrode active material of a waste lithium secondary battery;

(2) obtaining an Mn salt comprising manganese sulfate by performing primary solvent extraction on the leachate with a first phosphoric acid-based material;

(3) obtaining a Ni salt comprising nickel sulfate by precipitating the raffinate of the primary solvent extraction with an oxime-based material; and (4) obtaining a Co salt comprising cobalt sulfate by performing secondary solvent extraction on the leachate having undergone the precipitation, with a second phosphoric acid-based material.

2. The method of claim 1, wherein the positive electrode active material of the waste lithium secondary battery comprises a positive electrode active material represented by Formula 3:

$$LiNi_xCo_yMn_zO_2$$ [Formula 3]

(In Formula 1, $0<x<10$, $0<y<10$, and $0<z<10$, and $x+y+z=10$).

3. The method of claim 1, wherein the first phosphoric acid-based material and the second phosphoric acid-based material each independently comprise one or more compounds selected from compounds represented by Formula 2 or Formula 3,

[Formula 2]

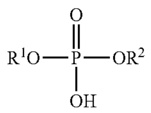

(In Formula 2, $R^1$ and $R^2$ each independently represent a linear or branched C1-C30 alkyl group comprising or not comprising a hetero atom),

[Formula 3]

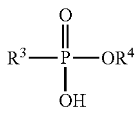

(In Formula 3, $R^3$ and $R^4$ each independently represent a liner or branched C1-C30 alkyl group comprising or not comprising a hetero atom).

4. The method of claim 3, wherein the first phosphoric acid-based material and the second phosphoric acid-based material each independently comprise one or more selected from di-(2-ethylhexyl) phosphoric acid and 2-ethylhexyl phosphonic acid mono 2-ethylhexyl ester.

5. The method of claim 1, wherein the oxime-based material comprises one or more selected from the group consisting of dimethylglyoxime, diethylglyoxime, dipropylglyoxime, and ethylmethylglyoxime.

6. The method of claim 1, wherein steps (2) through (4) are performed in an acidic atmosphere.

7. The method of claim 6, wherein step (2) is performed in a pH level of 2 to 4, step (3) step is performed at a pH level of 4 to 6, and step (4) step is performed at a pH level of 4 to 5.5.

8. The method of claim 1, further comprising adding sulfuric acid to the Ni salt obtained in step (3).

9. The method of claim 1, wherein the positive electrode active material of the waste lithium secondary battery is obtained by pulverizing the waste lithium secondary battery and then heat treating the pulverized waste lithium secondary battery.

* * * * *